Sept. 26, 1933.  K. MELLER  1,927,896
AUTOMATIC WELDING DEVICE
Filed April 17, 1931
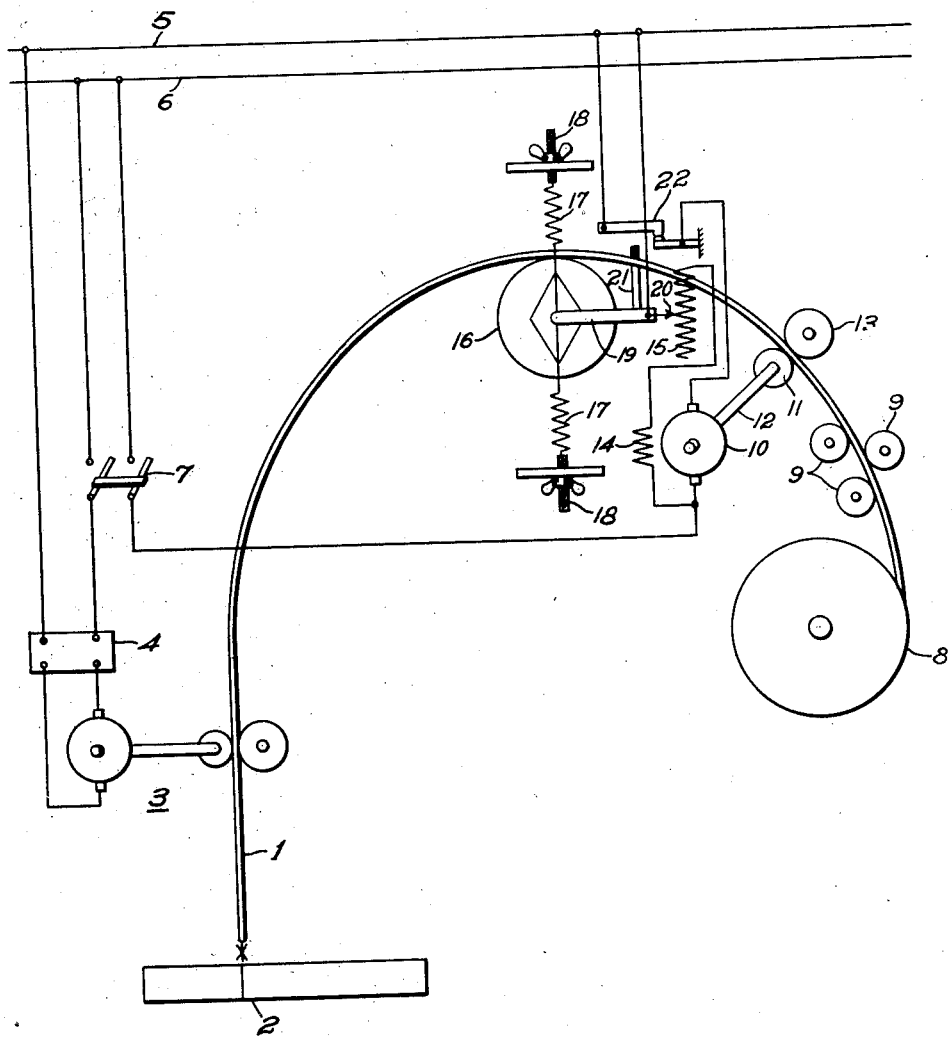
WITNESSES:
INVENTOR
Karl Meller.
BY
ATTORNEY Patented Sept. 26, 1933

1,927,896

UNITED STATES PATENT OFFICE 1,927,896

AUTOMATIC WELDING DEVICE

Karl Meller, Berlin-Siemensstadt, Germany, assignor to Westinghouse Electric & Manufacturing Company, a corporation of Pennsylvania Application April 17, 1931, Serial No. 530,769, and in Germany May 22, 1930

12 Claims. (Cl. 219—8)

My invention relates to welding apparatus and it has particular relation to automatic arc-welding apparatus.

In the past, it has been the practice in automatic arc welding to feed the welding electrode directly from the reel on which it is wound to the welding head.

It has been necessary to provide a welding head that will not only feed the electrode to perform the welding operation but will also develop sufficient power to unwind the electrode from the reel. Since the power required for unwinding the electrode is considerable, especially when electrodes of large diameter, such as one-half inch, are used, a large welding head is necessary to satisfactorily feed the electrode. With a large welding head, the sensitivity of feed thereof is generally lessened, and satisfactory welding conditions cannot be obtained.

It is, therefore, an object of my invention to provide an auxiliary feeding device for use in automatic arc welding.

The principal object of my invention is to provide for feeding an electrode to an automatic arc-welding head at substantially the same rate that it is fed, the welding head to perform the welding operation.

Another object of my invention is to provide for removing irregularities in the welding electrode before it is fed to the welding head.

A further object of my invention is to provide for adjusting the rate at which an auxiliary feeding device will feed an electrode to an automatic arc-welding head.

Still another object of my invention is to provide for stopping an auxiliary electrode-feeding mechanism when it is over-feeding the electrode to a welding head.

Other objects of my invention will become evident from the following detailed description, taken in connection with the accompanying drawing in which the single figure diagrammatically represents a welding system in accordance with my invention.

Referring to the drawing, a welding electrode 1 is fed, by means of a welding head 3, to perform a welding operation on the work 2, in a manner well known in the art.

An automatic control apparatus 4 is provided for regulating the rate at which the electrode 1 is fed to the work 2. Since this automatic control apparatus may be of any standard construction well known in the art, it will not be described in detail in this specification.

Electric power for operating the welding head 3 is obtained from the supply conductors 5 and 6. A switch 7 is provided for connecting the welding head 3 and the automatic control apparatus to supply conductors. In addition, the switch 7 is arranged to connect other apparatus to the supply conductor 6, as will be hereinafter described.

The welding electrode 1 is unwound from a reel 8 and pulled through the straightening rolls 9 by means of a motor 10 which serves to rotate the feeding roll 11 through the shaft 12. An idler roll 13 is disposed, as shown, to cooperate with the feed roll 11.

The motor 10 is provided with a shunt field winding 14 and a field resistor 15 which is connected in series-circuit therewith.

In order to automatically adjust or vary the effectiveness of the field resistor 15, a sheave 16 is disposed to be operated upon by the welding electrode 1, in a manner that will be hereinafter described. The sheave 16 is carried by springs 17, the tension of which may be readily adjusted by means of adjusting screws 18.

An operating arm 19 is carried by the sheave 16 and has a brush 20 mounted thereon which is connected to the supply conductor 5 and is disposed to make electrical contact with the resistor 15.

A contact-actuating arm 21 is also carried by the operating arm 19 and serves to open the normally closed contact members 22 which are connected in series-circuit with the motor 10 and to the supply conductor 5.

The operation of the above-described apparatus may be set forth as follows:

The switch 7 is closed, thereby energizing the automatic control apparatus 4 and the welding head 3. In addition, it will be seen that the motor 10 will also be energized when the switch 7 is closed.

The welding electrode 1 is fed to the work 2 by means of the welding head 3 and, at the same time, it is unwound from the reel 8, pulled through the straightening rolls 9 and fed over the sheave 16 to the welding head 3 by means of motor 10. The position of the sheave 16 is so adjusted by means of adjusting screws 18 that, under normal operating conditions, the motor 10 will actuate the feed roll 11 to feed the electrode 1 to the welding head at substantially the same rate that the latter feeds it to the work 2.

If the speed of the motor 10 is such that the electrode is fed to the welding head 3 at a rate which is less than the rate at which it feeds the electrode to the work 2, the sheave 16 will be moved downwardly. This movement of the sheave in a downward direction is caused by the increased tension produced in the welding electrode because of the slower feeding rate of motor 10.

The brush 20, carried by the operating arm 19, will also be moved downwardly with the sheave 16 and will cause the resistance, in series circuit with the shunt field winding 14, to be increased. It will be readily understood that this increase of resistance will cause the speed of the motor 10 to be increased and, in turn, the electrode will be more rapidly unwound from the reel 8. There will then result a decrease in the tension in the welding electrode which will permit sheave 16 to be moved upwardly, by the springs 17, to reduce the speed of the motor.

Conversely, if the electrode is fed at a greater rate to the welding head than it is fed thereby to the work 2, the tension in the electrode will be decreased, and the sheave 16 will be moved upwardly under the influence of the springs 17. The brush 20 will also be moved upwardly with the sheave 16 and will cause the resistance in the shunt field winding circuit to be decreased. The speed of the motor 10 will be reduced, and the speed at which the electrode is fed to the welding head will also be decreased. The tension in the electrode will then be increased, and the sheave 16 will be moved downwardly.

In the event that the motor 10 feeds the electrode to the welding head 3 at such rate that the tension in the electrode is decreased below a predetermined value, the sheave 16 will be moved upward sufficiently to cause the contact-actuating arm 21 to open the contact members 22. It will be seen that the opening of contact members 22 will open the circuit to the motor 10 from the supply conductor 5 and the unwinding of the electrode from the reel 8 will be stopped. When sufficient tension is again developed in the electrode, which is caused by its being fed by the welding head 3, the contact members 22 will be closed, and the motor 10 will rotate to further unwind the electrode from the reel.

It will be readily appreciated by one skilled in the art that many modifications of my automatic feeding device may be devised. For instance, the motor 10 may be of a constant-speed type, and the pressure between feed roll 11 and idler roll 13 may be varied in accordance with the tension produced in the electrode by the welding head 3. In addition, suitable relays may be interposed between the brush 20 and the resistor 15 for varying the resistance in the circuit of shunt field winding 14.

Therefore, I do not wish to be restricted to the specific structural details and arrangement of parts, or to the circuit connections herein set forth, as various modifications thereof may be effected without departing from the spirit and scope of my invention. I desire that only such limitations shall be imposed as are indicated in the appended claims.

I claim as my invention:

1. Arc-welding apparatus comprising, in combination, a welding head having driving connection with and disposed to feed a welding electrode to perform a welding operation, motor operated means having driving connection with the electrode for feeding it to the welding head, and control means connected to the motor operated means for automatically and continually regulating the rate of electrode feed to the welding head.

2. Arc-welding apparatus comprising, in combination, a welding head having driving connection with and disposed to feed a welding electrode to perform a welding operation, a motor having driving connection with the welding electrode and resiliently-mounted means controlled by the speed at which the electrode is fed by the welding head for automatically adjusting the rate at which the electrode is fed by the motor to the welding head.

3. In welding apparatus, the combination of a welding head having driving connection with and disposed to feed a welding electrode to perform a welding operation, with adjustable means also having driving connection with the welding electrode for feeding it to the welding head at substantially the same rate of speed that the welding head feeds the electrode to perform the welding operation, and means operatively connected to the adjustable means for stopping said adjustable feeding means when a predetermined tension is applied thereto by the welding electrode.

4. In welding apparatus, the combination of a welding head having driving connection with and disposed to feed a welding electrode to perform a welding operation, with an electric motor also having driving connection with the electrode and disposed to feed it to the welding head, and adjustable means connected to the motor for continually regulating the speed thereof, said adjustable means being controlled by the rate at which the electrode is fed by the welding head.

5. In welding apparatus, the combination of a welding head having driving connection with and disposed to feed a welding electrode to perform a welding operation, with an electric motor also having driving connection with the electrode and disposed to feed it to the welding head, an energizing circuit for the motor, adjustable means connected to the motor for continually regulating the speed thereof, said adjustable means being controlled by the rate at which the electrode is fed by the welding head, and contact means connected in the energizing circuit for the motor for opening the energizing circuit for the motor when the electrode is fed thereby at a predetermined rate.

6. Arc-welding apparatus comprising, in combination, a welding head having driving connection with and disposed to feed a welding electrode to perform a welding operation, an electric motor also having driving connection with the electrode for feeding it to the welding head, a circuit for energizing the motor, and adjustable and resiliently mounted means for continually and unintermittently adjusting the speed of the motor, said means being controlled by the rate at which the electrode is fed by the welding head.

7. Arc-welding apparatus comprising, in combination, a welding head having driving connection with and disposed to feed a welding electrode to perform a welding operation, an electric motor also having driving connection with the electrode for feeding it to the welding head, a circuit for energizing the motor, adjustable and resiliently mounted means for continually and unintermittently adjusting the speed of the motor, said means being controlled by the rate at which the electrode is fed by the welding head, and circuit opening means for opening the energizing circuit for the motor when the electrode is fed by the welding head at a predetermined rate.

8. Arc-welding apparatus comprising, in combination, a welding head having driving connection with and disposed to feed a welding electrode to the work on which a welding operation is to be performed, an electric motor also having driving connection with the electrode for feeding it to the welding head, an energizing circuit for the motor, and means for continually and unintermittently regulating the rate at which the electrode is fed to the welding head by the motor in accordance with the rate at which the electrode is fed by the welding head to the work.

9. Arc-welding apparatus comprising, in combination, a welding head having driving connection with and disposed to feed a welding electrode to work on which a welding operation is to be performed, an electric motor also having driving connection with the electrode for feeding it to the welding head, a circuit for energizing the motor, means for continually and unintermittently regulating the rate at which the electrode is fed to the welding head by the motor in accordance with the rate at which the electrode is fed thereby to the work, and circuit opening means for opening the energizing circuit to the motor when the rate at which the electrode is fed to the welding head exceeds a predetermined value.

10. Arc-welding apparatus comprising, in combination, a welding head having driving connection with and disposed to feed a welding electrode to work on which a welding operation is to be performed, an electric motor having driving connection with and disposed to feed the electrode to the welding head, means for continually and unintermittently regulating the speed of the motor to feed the electrode to the welding head at substantially the same rate as it is fed thereby to the work, and circuit opening means for stopping the motor when the electrode is fed to the welding head at a predetermined rate.

11. Arc-welding apparatus comprising, in combination, a welding head having driving connection with and disposed to feed a welding electrode to work on which a welding operation is to be performed, an electric motor having driving connection with and disposed to feed the electrode to the welding head, a shunt field winding for the motor, a resistor connected in series-circuit with the shunt field winding, and resiliently mounted means for continually and unintermittently varying the effectiveness of the resistance in circuit with the shunt field winding to vary the speed at which the motor feeds the electrode to the welding head in accordance with the speed at which the electrode is fed to the work.

12. Arc-welding apparatus comprising, in combination, a welding head having driving connection with and disposed to feed a welding electrode from a reel to perform a welding operation, an electric motor having driving connection with a feeding roll for unwinding the electrode from the reel, an idler roller for cooperating with the feeding roll, said feed motor being provided with a shunt field winding, a resistor connected in series circuit with the shunt field winding, a sheave carried by a plurality of adjustable springs over which the welding electrode is disposed to pass, an operating arm carried by the sheave, a brush carried by the operating arm and disposed to make contact with the resistor at different points for varying the resistance of the shunt field circuit, a pair of normally closed contact members in series circuit with the motor, a contact-actuating arm carried by the operating arm for opening the contact members when a predetermined tension is applied to the electrode, and a plurality of straightening rollers for removing irregularities in the electrode as it is unwound from the reel.

KARL MELLER.